(12) United States Patent
Im et al.

(10) Patent No.: US 12,567,236 B2
(45) Date of Patent: Mar. 3, 2026

(54) CONTINUOUS USE AUTHENTICATION METHOD, DEVICE, AND RECORDING MEDIUM

(71) Applicant: LG CNS CO., LTD., Seoul (KR)

(72) Inventors: Yoo Bin Im, Seoul (KR); Kyung Tae Ko, Seoul (KR); Gi Wan Park, Seoul (KR); Byeong Kweon Park, Seoul (KR); Seungun Lee, Seoul (KR); Tai Heon Hong, Seoul (KR)

(73) Assignee: LG CNS CO., LTD., Seoul (KR)

( * ) Notice: Subject to any disclaimer, the term of this patent is extended or adjusted under 35 U.S.C. 154(b) by 398 days.

(21) Appl. No.: 18/257,536

(22) PCT Filed: Dec. 10, 2021

(86) PCT No.: PCT/KR2021/018717
§ 371 (c)(1),
(2) Date: Jun. 14, 2023

(87) PCT Pub. No.: WO2022/131689
PCT Pub. Date: Jun. 23, 2022

(65) Prior Publication Data
US 2024/0112445 A1 Apr. 4, 2024

(30) Foreign Application Priority Data
Dec. 14, 2020 (KR) ........................ 10-2020-0174764

(51) Int. Cl.
*G06V 10/764* (2022.01)
*G06F 18/24* (2023.01)
(Continued)

(52) U.S. Cl.
CPC ............ *G06V 10/764* (2022.01); *G06F 18/24* (2023.01); *G06F 21/31* (2013.01); *G06F 21/57* (2013.01); *H04N 21/44224* (2020.08)

(58) Field of Classification Search
CPC .......... G06F 21/31; G06F 21/57; G06F 18/24; G06V 10/764; H04N 7/155; H04N 21/44224
See application file for complete search history.

(56) References Cited

U.S. PATENT DOCUMENTS 9,996,803 B2 * 6/2018 Li ............................ G06F 21/31
10,111,093 B2 10/2018 Harthattu et al.
(Continued)

FOREIGN PATENT DOCUMENTS

KR 10-2002-0092515 A 12/2002
KR 10-2010-0012124 A 2/2010
(Continued)

OTHER PUBLICATIONS

Won, et al. (Computer English Translation of Korean Patent No. KR-10-1133225 B1). (Year: 2012).*
(Continued)

*Primary Examiner* — Daniel G Mariam

(57) ABSTRACT

A continuous use authentication method includes: acquiring a normal state image and a current image for a user; determining an inferred classification state for the user from among a plurality of classification states by applying the normal state image and the current image to a low-depth inference model for the user; when the inferred classification state is included in an abnormality category, determining a high-depth inference model corresponding to the inferred classification state from among a plurality of high-depth inference models; and determining reliability of the inferred classification state by applying the current image to the high-depth inference model.

16 Claims, 9 Drawing Sheets

(51) Int. Cl.
    *G06F 21/31*         (2013.01)
    *G06F 21/57*         (2013.01)
    *H04N 21/442*     (2011.01)

(56)             References Cited

U.S. PATENT DOCUMENTS

| | | | |
|---|---|---|---|
| 10,366,217 B2 * | 7/2019 | Finzi ....................... | H04L 9/321 |
| 11,636,187 B2 * | 4/2023 | Melnikov ............... | G06F 21/31 |
| | | | 726/7 |
| 2016/0205094 A1 | 7/2016 | Harthattu et al. | |
| 2016/0217198 A1 | 7/2016 | Lee et al. | |

FOREIGN PATENT DOCUMENTS

| | | |
|---|---|---|
| KR | 10-1133225 B1 | 4/2012 |
| KR | 10-1263590 B1 | 5/2013 |
| KR | 10-2016-0091786 A | 8/2016 |
| KR | 10-2018-0074565 A | 7/2018 |
| KR | 10-1977845 B1 | 5/2019 |
| KR | 10-2020-0075063 A | 6/2020 |
| KR | 10-2020-0080533 A | 7/2020 |
| KR | 10-2020-0092225 A | 8/2020 |

OTHER PUBLICATIONS

Amini, et al. (DeepAuth: A Framework for Continuous user Re-Authentication in Mobile Apps). (Year: 2018).*

* cited by examiner

FIG. 3

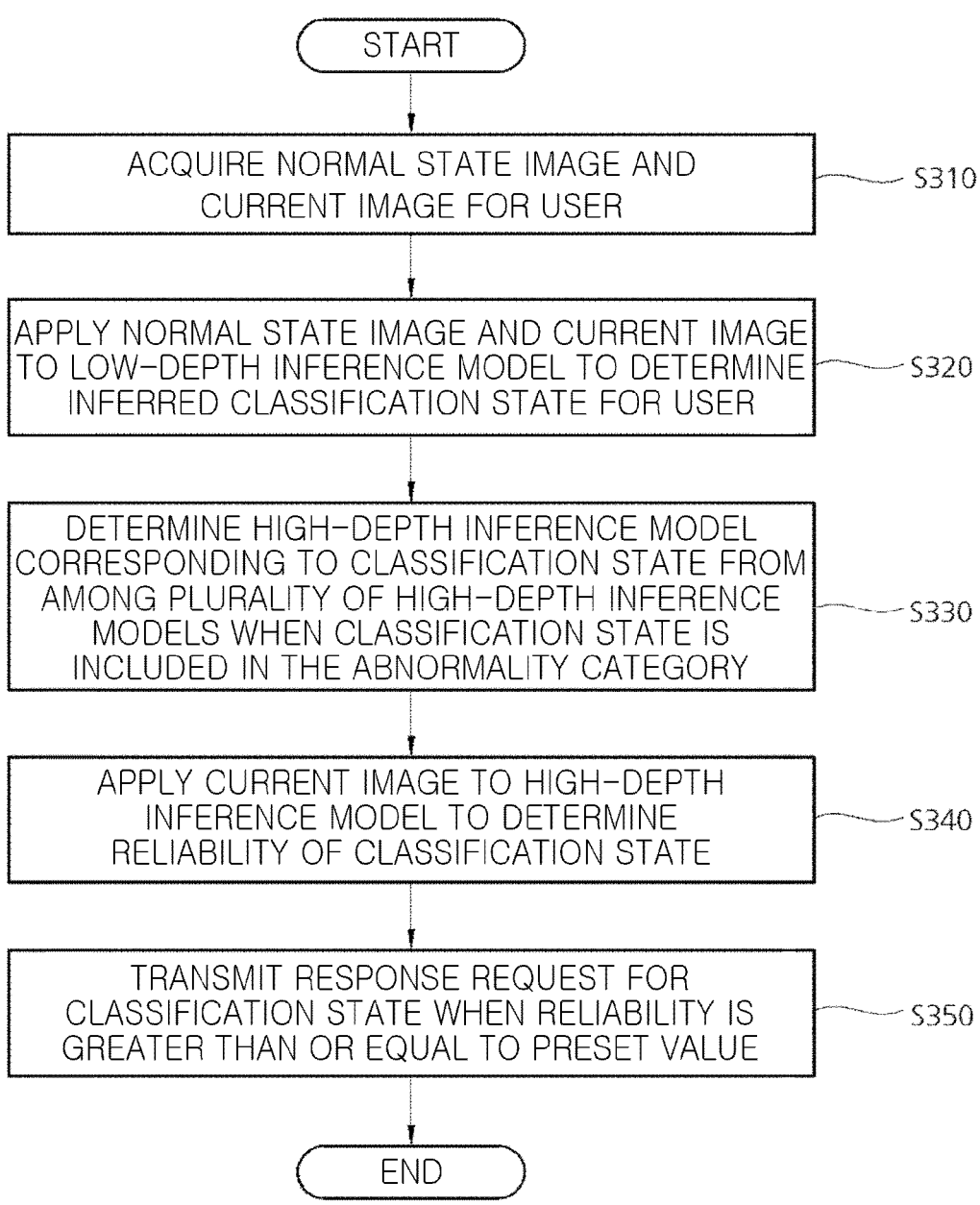

START

ACQUIRE NORMAL STATE IMAGE AND CURRENT IMAGE FOR USER — S310

APPLY NORMAL STATE IMAGE AND CURRENT IMAGE TO LOW-DEPTH INFERENCE MODEL TO DETERMINE INFERRED CLASSIFICATION STATE FOR USER — S320

DETERMINE HIGH-DEPTH INFERENCE MODEL CORRESPONDING TO CLASSIFICATION STATE FROM AMONG PLURALITY OF HIGH-DEPTH INFERENCE MODELS WHEN CLASSIFICATION STATE IS INCLUDED IN THE ABNORMALITY CATEGORY — S330

APPLY CURRENT IMAGE TO HIGH-DEPTH INFERENCE MODEL TO DETERMINE RELIABILITY OF CLASSIFICATION STATE — S340

TRANSMIT RESPONSE REQUEST FOR CLASSIFICATION STATE WHEN RELIABILITY IS GREATER THAN OR EQUAL TO PRESET VALUE — S350

END

FIG. 9

CONTINUOUS USE AUTHENTICATION METHOD, DEVICE, AND RECORDING MEDIUM

CROSS REFERENCE TO RELATED APPLICATIONS

The present application is a National Phase of International Application No. PCT/KR2021/018717 filed on Dec. 10, 2021, which claims the priority based on Korean Patent Application No. 10-2020-0174764 filed on Dec. 14, 2020, and the entire contents disclosed in the description and drawings of the corresponding applications are referenced in the present application.

TECHNICAL FIELD

The present disclosure relates to a continuous use certification method, a continuous use certification method device, and a recording medium, and more specifically, to a continuous use certification method, a continuous use certification device, and a recording medium, capable of reducing security risk and improving convenience of remote work by determining an inferred classification state for a user using an artificial intelligence-based inference model and transmitting a response request therefor.

BACKGROUND

User certification technology is for, in a process in which a user accesses a system through a computer or the like and uses a service of the system, identifying the user and verifying whether the service is being used by a normal user, and in particular, recently, demand for user certification technology has continuously increased in various business areas such as smart offices, home/remote work, remote education/exams, non-face-to-face financial services, etc.

Conventional user certification technology has a limitation in that once a user logs in to a system, it is impossible to confirm whether the user actually continues to use the system until the system use is terminated. In addition, there is a problem that, when a password or certification number required in the login process is exposed to other users, the other users can access the system.

In order to solve the above problems of the related art, the related art has been developed in which information on a user's face is obtained at first execution, a currently logged-in user is photographed in real time, and a mode is switched to a screen saver mode when the currently logged-in user is not the user on which the information is obtained at the first execution.

However, in the related art, a user is identified using only a facial image, and thus there is a limitation in precisely detecting various complex situations that can occur in an actual use environment, and when the user is not identified, the use is restricted by locking a screen, and thus there is a problem that security risk increases because it is difficult to respond to leakage of main information by the user or various other dangerous situations.

Further, when a high-level algorithm is intended to be installed in order to increase the accuracy of user certification, resources required in a user certification process increase exponentially, and thus it is difficult to implement the user certification process using the high-level algorithm in a general user terminal, and a server also has a difficulty to handle resources for identifying numerous users, such that there is a limitation to actual implementation of the user certification process.

Accordingly, there is a need for technology in which the above-described problems are solved and whether a user uses a device normally is accurately and efficiently monitored.

SUMMARY

The present disclosure is directed to providing a continuous use certification method, a continuous use certification device, and a recording medium, capable of reducing security risk and improving convenience of remote work by determining an inferred classification state for a user using an artificial intelligence-based inference model and transmitting a response request therefor.

Objects of the present disclosure are not limited to the above-described object and other objects that are not described may be clearly understood by those skilled in the art from the following descriptions.

One aspect of the present disclosure provides a continuous use certification method which includes acquiring a normal state image and a current image for a user; determining an inferred classification state for the user from among a plurality of classification states by applying the normal state image and the current image to a low-depth inference model for the user; when the inferred classification state is included in an abnormality category, determining a high-depth inference model corresponding to the inferred classification state from among a plurality of high-depth inference models; and determining reliability of the inferred classification state by applying the current image to the high-depth inference model.

The determining of the inferred classification state for the user may include applying fake data to the normal state image to acquire a converted image; obtaining a comparison result of the converted image and the current image using a convolutional neural network (CNN); and determining the inferred classification state according to the comparison result using the low-depth inference model.

In the acquiring of the normal state image and the current image, a background image for the user may be further acquired, and in the determining of the inferred classification state for the user, the inferred classification state may be determined by applying the normal state image, the current image, and the background image to the low-depth inference model.

The plurality of classification states may include an absence situation, an uncertificated user confirmation situation, and a photographing situation, and in the determining of the inferred classification state for the user, a probability value for each of the plurality of classification states may be determined, and a classification state in which the probability value is greater than or equal to a preset value is determined as the inferred classification state.

In the determining of the inferred classification state for the user, based on a comparison result of a first probability value that is highest and a second probability value that is secondarily high among the probability values for the plurality of classification states, a classification state corresponding to the first probability value may be determined as the inferred classification state.

The normal state image may be acquired a predetermined number of times by photographing the user in an initial user certification process, and the current image may be continuously acquired over time by photographing the user in a continuous use certification process.

The determining of the inferred classification state for the user may be performed in a client terminal, and the determining of the reliability of the inferred classification state may be performed in a server.

The continuous use certification method may further include obtaining a switchover request according to obtaining of an error message for the determination of the inferred classification state; transmitting the normal state image and the current image to an inference server in response to the switchover request; and determining the inferred classification state on the basis of the low-depth inference model implemented in the inference server.

The continuous use certification method may further include, when the inferred classification state is included in the abnormality category, providing an alarm indicating that a problem is likely to occur.

The continuous use certification method may further include, when the reliability is greater than or equal to a preset value, transmitting a response request for the inferred classification state, wherein the response request may include at least one of a request for transmitting an e-mail to an administrator account, a request for forced termination of a program determined according to the inferred classification state, a request for blocking a function of an input/output unit in a client terminal, a request for blocking communication of the client terminal, and a request for displaying preset warning content on the client terminal.

The acquiring of the normal state image and the current image for the user may further include acquiring the normal state image and a background image for the user in an initial user certification process; applying fake data to the normal state image and the background image to acquire a plurality of converted images; applying learning data including the normal state image, the background image, and the plurality of converted images to a CNN-based low-depth inference model to perform learning to determine the inferred classification state for the user; and obtaining the low-depth inference model for the user according to a result of performing the learning.

Another aspect of the present disclosure provides a continuous use certification device which includes a control unit configured to acquire a normal state image and a current image for a user, apply the normal state image and the current image to a low-depth inference model to determine an inferred classification state for the user, determine a high-depth inference model corresponding to the inferred classification state from among a plurality of high-depth inference models when the inferred classification state is included in an abnormality category, and apply the current image to the high-depth inference model to determine reliability of the inferred classification state, and transmits a response request for the inferred classification state when the reliability is greater than or equal to a preset value; and a storage unit configured to store the normal state image and the current image.

The control unit may apply fake data to the normal state image to acquire a converted image, obtain a comparison result of the converted image and the current image using a CNN, and determine the inferred classification state according to the comparison result using the low-depth inference model.

The control unit may further acquire a background image for the user, and determine the inferred classification state by applying the normal state image, the current image, and the background image to the low-depth inference model.

Still another aspect of the present disclosure provides a computer-readable recording medium on which a program for executing the continuous use certification method according to the first aspect in a computer is recorded. Alternatively, yet another aspect of the present disclosure provides a computer program stored on a recording medium to implement the continuous use certification method according to the first aspect is provided.

According to one embodiment of the present disclosure, artificial intelligence can detect the user's situation in real time and immediately execute the necessary controls, and thus security risk can be reduced and convenience of remote work can be improved.

Further, based on a video obtained in real time, no time lapse occurs in a continuous use certification process, and when a user is recognized by checking a background image, automatic control is possible, thereby improving user convenience.

Further, it is possible to recognize not only the user's face, but also various situations such as background changes, gestures, photographing pictures, and the like.

Further, it is possible to effectively respond to various situations by executing various control policies such as screen blocking, input/output blocking, communication environment blocking, and administrator notification, and the like.

Further, when applied to a non-face-to-face control system such as a remote test environment or the like, even when the user does not directly monitor, it is possible to automatically execute control policies by detecting abnormal situations on the basis of artificial intelligence facial recognition, so that it can be used as a tool to help test supervisors/administrators supervise.

Effects of the present disclosure are not limited to the above-described effects, and it should be understood that all possible effects deduced from a configuration of the present disclosure described in detailed descriptions and the claims are included.

BRIEF DESCRIPTION OF THE DRAWINGS

FIG. 3 is a flowchart illustrating a method for a continuous use certification device to perform continuous use certification for a user according to an embodiment.

FIG. 9 is a flowchart illustrating a series of operations in which a continuous use certification device obtains and learns an inference model for a user and determines an inferred classification state for the user on the basis of the obtained and learned inference model according to an embodiment.

DETAILED DESCRIPTION

Figure 1:
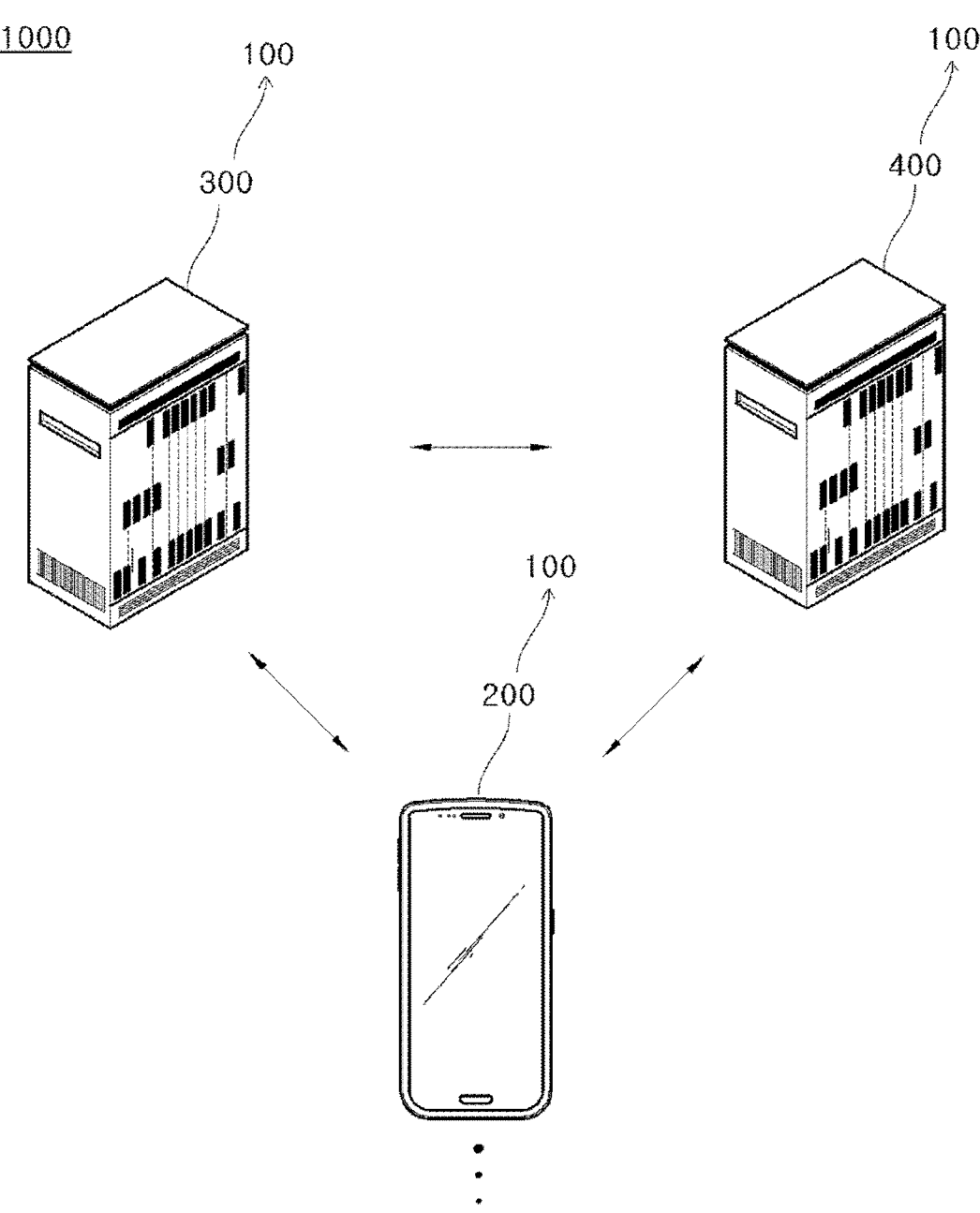
FIG. 1 is a schematic diagram illustrating a system for continuous use certification according to an embodiment.

Hereinafter, the present disclosure will be described with reference to the accompanying drawings. However, embodiments of the present disclosure may be implemented in several different forms and are not limited to embodiments described herein. In addition, parts irrelevant to description are omitted in the drawings in order to clearly explain the present disclosure. Similar parts are denoted by similar reference numerals throughout this specification.

Although the terms used herein are selected from among general terms that are currently and widely used in consideration of functions in embodiments of the present disclosure, these may be changed according to intentions of those skilled in the art, precedents, or the advent of new technology. In addition, in a specific case, some terms may be arbitrarily selected by applicants. In this case, meanings thereof will be described in detail in a corresponding description of embodiments of the present disclosure. Therefore, the terms used herein should be defined based on meanings of the terms and content of this entire specification, rather than simply the terms themselves.

Throughout this specification, when a certain part "includes" a certain component, it means that another component may be further included not excluding another component unless otherwise defined. Moreover, terms described in the specification such as " . . . part," " . . . unit," "module," "device," refer to a unit of processing at least one function or operation, and may be implemented by hardware or software or a combination thereof.

In addition, throughout this specification, when a part is referred to as being "connected" to another part, it includes "directly connected" and "indirectly connected" via an intervening part. Also, when a certain part "includes" a certain component, this does not exclude other components from being included unless described otherwise, and other components may in fact be included.

Throughout this specification, the term "support" may be broadly interpreted as meaning including the performance of related operations to achieve a specific purpose, and is not construed as limiting. For example, in a case in which server C supports server A so that server A performs operation B, server C's support for server A may be interpreted as comprehensively including the performance of related operations required in a process for server A to perform operation B. For example, server C may perform provision of related information necessary for server A to perform operation B, a preliminary operation expected to be needed in the process for server A to perform operation B, reception of a message requested by server A to perform operation B, and the like.

Throughout this specification, the term "providing" may be interpreted as comprehensively including a process in which an object obtains specific information or directly or indirectly transmits or receives specific information to or from a specific object and including the performance of related operations required in this process.

Hereinafter, embodiments of the present disclosure that can be easily performed by those skilled in the art will be described in detail with reference to the accompanying drawings. However, embodiments of the present disclosure may be implemented in several different forms, and are not limited to embodiments described herein.

Hereinafter, embodiments of the present disclosure will be described in detail with reference to the accompanying drawings.

FIG. 1 is a schematic diagram illustrating a system 1000 for continuous use certification according to an embodiment.

Referring to FIG. 1, the system 1000 may include a continuous use certification device 100.

The continuous use certification device 100 is a device that can perform continuous use certification for a user. For example, in a non-face-to-face work environment such as telecommuting, remote work, or the like, the continuous use certification device 100 may certificate the user's continuous use of a system such as a work server or the like by continuously monitoring the user's situation in real time based on artificial intelligence (AI), and perform the device control required according to whether or not continuous use is being executed in a manner suitable for the user's situation, thereby reducing security risk, improving convenience of remote work, and increasing the usability of untact services.

Throughout this specification, the continuous use certification device 100 may be understood as a concept including one or more devices (e.g., a server and/or a terminal) each operating through a computer program for realizing functions described in this specification. In one embodiment, the continuous use certification device 100 may include at least one of one or more client terminals 200, a server 300, and an inference server 400.

In one embodiment, the one or more client terminals 200, the server 300, and the inference server 400 may be connected to each other through a network. Here, the network may be configured regardless of its communication manner such as wired communication, wireless communication, or the like, and may be composed of any of various communication networks such as a local area network (LAN), a metropolitan area network (MAN), a wide area network (WAN), and the like.

In one embodiment, the client terminal 200 is a device associated with a user and represents a computing device corresponding to a user's account. For example, the client terminal 200 may be a device such as a computer used by a user who wants to be certificated for continuous use by subscribing a continuous use certification service provided by the continuous use certification device 100. In one embodiment, the client terminal 200 may be implemented as any of various types of handheld-based wireless communication devices such as mobile phones, smartphones, personal digital assistants (PDAs), portable multimedia players (PMPs), tablet personal computers (PCs), and the like, or may include any of various types of wired/wireless communication devices such as desktop PCs, tablet PCs, and laptop PCs connected to an external server to install and execute applications.

In one embodiment, the server 300 and the inference server 400 may each be implemented as a server such as a computer or the like operating through a computer program for realizing functions described in this specification. In one embodiment, the server 300 may include the inference server 400.

The continuous use certification device 100 according to an embodiment may be implemented in any of various modified forms through a combination of various devices and functions described throughout this specification. In one embodiment, the continuous use certification device 100 may include one or more client terminals 200, a server 300, and an inference server 400. In another embodiment, the continuous use certification device 100 may include one or more client terminals 200 and a server 300, and the system 1000 may include the continuous use certification device 100 and an inference server 400. In still another embodiment, the continuous use certification device 100 may include a server 300 and an inference server 400, and the system 1000 may include the continuous use certification device 100 implemented as a server and one or more client terminals 200.

Hereinafter, an embodiment, in which the continuous use certification device 100 includes the client terminal 200, the server 300, and the inference server 400 and a unique function for continuous use certification is performed in each of the client terminal 200, the server 300, and the inference server 400, is mainly described, but embodiments of the present disclosure are not limited thereto, and the continuous use certification device 100 may be implemented in any of various forms as described above and the content related to various embodiments will be described below with reference to FIGS. 4 to 9.

Further, the system 1000 for providing test information may further include other general-purpose components in addition to the components illustrated in FIG. 1. For example, the system 1000 may further include a work server or the like that receives results of the continuous use certification for the user from the continuous use certification device 100 in conjunction with the continuous use certification device 100 for a specific purpose (e.g., confirmation of attendance for work purpose).

Figure 2:
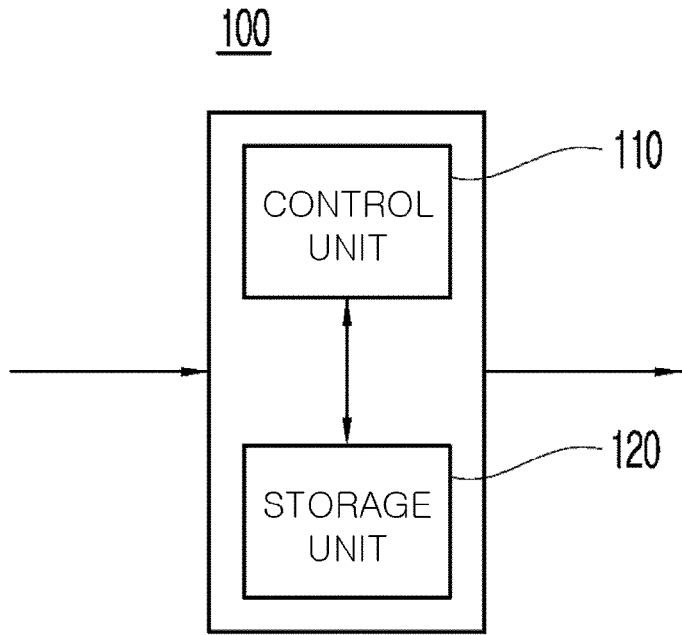
FIG. 2 is a block diagram illustrating a continuous use certification device according to an embodiment.

FIG. 2 is a block diagram illustrating a continuous use certification device 100 according to an embodiment. The continuous use certification device 100 shown in FIG. 2 may correspond to the continuous use certification device 100 of FIG. 1.

Referring to FIG. 2, the continuous use certification device 100 may include a control unit 110 and a storage unit 120.

The control unit 110 acquires a normal state image and a current image for a user, applies the normal state image and the current image to a low-depth inference model to determine an inferred classification state for the user, determines a high-depth inference model corresponding to the inferred classification state from among a plurality of high-depth inference models when the inferred classification state is included in an abnormality category, applies the current image to the high-depth inference model to determine reliability of the inferred classification state, and transmits a response request for the inferred classification state when the reliability is greater than or equal to a preset value. The storage unit 120 stores the normal state image and the current image.

The series of operations and configurations described above will be described below in detail with reference to FIGS. 3 to 9.

In one embodiment, the control unit 110 may perform a series of operations for continuous use certification, may be implemented as a central processor unit (CPU) that controls an overall operation of the continuous use certification device 100, and may be electrically connected to the storage unit 120 and other components to control data flow therebetween. In one embodiment, the control unit 110 may include one or more processors (e.g., CPUs) that are included in each of one or more devices (e.g., servers and/or terminals) included in the continuous use certification device 100 and independently controls overall functions of each of the one or more devices.

In one embodiment, the storage unit 120 may include a secondary storage device implemented with a non-volatile memory such as a solid-state disk (SSD) or a hard disk drive (HDD) capable of storing pieces of information necessary for the overall operation of the continuous use certification device 100, or may include a main memory implemented with a volatile memory such as a random-access memory (RAM). In one embodiment, the storage unit 120 may include one or more databases or cloud storages, or may be implemented as a separate storage server to provide a storage space for the continuous use certification to the continuous use certification device 100. In one embodiment, the storage unit 120 may include one or more storage modules that are included in each of the one or more devices (e.g., servers and/or terminals) included in the continuous use certification devices 100 to store pieces of information required or generated in the overall functions of each of the one or more devices.

Further, it may be understood by those skilled in the art that other general-purpose components in addition to the components illustrated in FIG. 2 may be further included in the continuous use certification device 100. For example, the continuous use certification device 100 may further include a communication module for communicating between the components (e.g., the client terminal 200 and the server 300) or communicating with another device (e.g., a terminal or a server) through a network, an input/output interface for receiving a user input or outputting information, and the like.

FIG. 3 is a flowchart illustrating a method for the continuous use certification device 100 to perform the continuous use certification for a user according to an embodiment.

Referring to FIG. 3, in operation S310, the continuous use certification device 100 may acquire a normal state image and a current image for the user. In one embodiment, the normal state image may be acquired a predetermined number of times in an initial user certification process, and the current image may be continuously acquired over time. For example, the continuous use certification device 100 may generate a plurality of normal state images by photographing the user in the initial user certification process, generate a low-depth inference model using the plurality of normal state images, and continuously generate the current image by continuously photographing the user in a continuous use certification process.

More specifically, the client terminal 200 may perform the initial user certification process, in which whether a currently logged-in user is subject to the continuous use certification is initially certificated based on user identification information (e.g., ID and/or password) input by the user and user information (e.g., whether or not to be continuous use certification, company information for which a result of the continuous use certification will be provided, etc.) corresponding to the user identification information, Accordingly, when the user is initially certificated, the client terminal 200 may photograph a preset target area using a built-in camera module (e.g., a webcam), acquire a normal state image used as learning data of an inference model, and then transmit the normal state image together with the user information to the server 300.

Further, the server 300 may apply the received normal state image to a pre-stored low-depth inference model to perform learning and to determine an inferred classification state for the user on the basis of the received normal state image, generate and update the low-depth inference model optimized for the user to store and manage the low-depth inference model together with the user information according to a result of performing the learning, and transmit the low-depth inference model optimized for the user to the client terminal 200. Further, when receiving the low-depth inference model, the client terminal 200 may continuously photograph the target area in the user certification process to generate a current image to be applied to the low-depth inference model at a preset period.

In one embodiment, the continuous use certification device 100 may further acquire a background image for the user. For example, the client terminal 200 may generate a preset number or more of normal state images and background images by photographing a case in which the user is present in the target area and a case in which the user is absent in the target area, respectively, and transmit the normal state images and the background images to the server 300, and the server 300 may generate and update the low-depth inference model using all the normal state images and the background images.

In one embodiment, the continuous use certification device 100 may acquire converted images by applying fake data to the normal state images and obtain the low-depth inference model optimized for the user using a convolutional neural network (CNN). More specifically, when the continuous use certification device 100 acquires the normal state images and the background images in the initial user certification process, the continuous use certification device 100 may acquire a plurality of converted images by applying the fake data to the normal state images and the background images, perform learning to determine the inferred classification state for the user by applying learning data including the normal state images, the background images, and the plurality of converted images to a CNN-based low-depth inference model, and obtain the low-depth inference model for the user according to a result of performing the learning.

For example, the server 300 may generate a situation recognition classification model according to a cognitive policy using an image synthesis application programming interface (API), input a normal state image in which the user's face and upper body are included in the target area at a predetermined ratio or more, a background image in which the user is not present within the target area, and a plurality of pieces of pre-stored fake data to the situation recognition classification model, perform generation of the converted image according to synthesis and conversion between multiple images, extraction of feature points from the converted image, and learning of the situation recognition classification model on the basis of the extracted feature points, and generate the low-depth inference model optimized for the user as an AI-based lightweight model.

In one embodiment, the classification state may include at least one of an absence situation, an uncertificated user confirmation situation, and a photographing situation. The absence situation represents an absence recognition case in which the user is absent within the target area, the uncertificated user confirmation situation represents a third-party recognition case in which a third party other than the user himself/herself uses a system or an additional third party is recognized together with the user, and the photographing situation represents a photographing recognition case in which someone's camera photographing action within the target area is detected.

In one embodiment, the classification state may include a normal work situation and further include abnormal work situations (e.g., the case of sleeping within the target area and the like) and various other abnormal work situations (e.g., a case in which the user's gaze and gesture are detected as abnormal, a case in which a change in the background positioned behind the user is detected, and the like). The normal work situation may be included in a normality category, and the absence situation, the uncertificated user confirmation situation, the photographing situation, the abnormal work situation, and the other abnormal situations may be included in an abnormality category. In one embodiment, the classification state is not limited to the above-described classification states and may further include various types of classification states applicable as the user's situation.

In one embodiment, the fake data may include a plurality of sample images for inferring whether the user's situation is in the classification state included in the abnormality category, and may include information about a method of changing (e.g., size change, rotating an angle, object position movement, color change, image quality change, etc.) an image or changing objects in the image.

In one embodiment, the fake data may include a second number of sample images corresponding to any one of a first number of classification states. The second number may be greater than the first number. For example, the fake data may include a plurality of pieces of first sample data, second sample data, and third sample data for detecting the absence situation, the uncertificated user confirmation situation, and the photographing situation, respectively, by being synthesized to the normal state image or the background image.

In one embodiment, the converted image may be generated for each of the plurality of classification states determined based on the user information, and learning for the low-depth inference model may be performed using the converted image. For example, the server 300 may check the classification states registered to the user, and when the classification states of the normal situation, the absence situation, the uncertificated user confirmation situation, and the photographing situation are registered, the server 300 may add a classifier for each classification state to the CNN, convert and synthesize the normal state image, the background image, and the fake data for each classification state to generate a learning image, and then learn the low-depth inference model by applying learning data corresponding to the learning image.

In one embodiment, the low-depth inference model may include a first deep learning inference model that requires resources at a preset level or less in the inference process. For example, the low-depth inference model may be implemented through a first CNN inference model having a low accuracy compared to the high-depth inference model by applying a lightweight neural network structure, and thus the low-depth inference model may continuously operate well even in the client terminal 200 with relatively low specifications.

In operation S320, the continuous use certification device 100 may apply the normal state image and the current image to the low-depth inference model to determine the inferred classification state for the user. In one embodiment, the determination of the inferred classification state for the user may be performed in the client terminal 200, and the inferred classification state for the user may be determined by applying the normal state image, the current image, and the background image to the low-depth inference model. For example, when the low-depth inference model is obtained based on the normal state image and the background image acquired in the initial user certification process, the client terminal 200 may input the current image continuously acquired in the subsequent user certification process to the low-depth inference model to determine the inferred classification state for the user as the normal situation, the absence situation, the uncertificated user confirmation situation, or the photographing situation.

In one embodiment, the continuous use certification device 100 may acquire the converted image by applying the fake data to the normal state image, obtain a comparison result of the converted image and the current image using the CNN, and determine the inferred classification state for the user according to the comparison result of the converted image and the current image using the low-depth inference model. For example, the client terminal 200 may input the current image captured in real time through a camera module to the CNN-based low-depth inference model obtained using the normal state image, the background image, and the fake data to infer the classification state for the user, and may detect the converted image in which a difference from the current image is less than a preset level, and determine a specific classification state corresponding to the converted image as the inferred classification state for the user.

In one embodiment, the low-depth inference model may include at least one of a CNN-based feature extractor and a deep neural network (DNN)/machine learning (ML)-based classifier. For example, it is possible to extract feature values of a converted image labeled (e.g., classified) using a CNN and learn a DNN or ML classification algorithm (e.g., SVM, etc.) with the extracted feature values of the converted image. The low-depth inference model may be generated and learned in a method in which feature values of the current image labeled (e.g., classified) are extracted using the CNN and a probability value for each classification is obtained using the DNN or ML classification algorithm (e.g., SVM, etc.) learned with the feature values of the converted image.

In one embodiment, the CNN means that various models derived from a CNN such as ResNet, VggNet, and Mobile-Net are applied. In one embodiment, the low-depth inference model and the high-depth inference model may each include any of various algorithms available for deep learning-based inference in addition to the CNN.

In one embodiment, the continuous use certification device 100 may determine a probability value for each of the plurality of classification states, and determine a classification state in which its probability value is greater than or equal to a first preset value as the inferred classification state for the user. For example, the client terminal 200 may calculate a probability value for each of the normal situation, the absence situation, the uncertificated user confirmation situation, and the photographing situation by applying the current image to the low-depth inference model. The client terminal 200 may determine the corresponding classification state as the inferred classification state for the user to transmit event information including the determined inferred classification state and the corresponding probability value to the server 300 when the probability value for at least one classification state is greater than or equal to the first preset value (e.g., 0.8). On the other hand, the client terminal 200 may transmit, to the server 300, the current image and a request signal requesting inference through the high-depth inference model of the server 300 when the probability values of all the classification states are less than the first preset value.

In one embodiment, based on a comparison result of a first probability value that is highest and a second probability value that is secondarily high among the probability values for the plurality of classification states, the continuous use certification device 100 may determine a classification state corresponding to the first probability value as the inferred classification state for the user. For example, only when a difference between the first probability value and the second probability value is greater than or equal to a second preset value (e.g., 0.5), the continuous use certification device 100 may determine the classification state corresponding to the first probability value as the inferred classification state for the user. That is, since a plurality of probability values among the probability values for the plurality of classification states may be similarly calculated with low values, the inferred classification state may be determined by finding a probability value that is "conspicuous" at a certain level or more compared to other probability values.

In one embodiment, the determination of the probability value for each classification state in the low-depth inference model may be performed based on an administrator's selection input. For example, in the case of (normal, absence, third-party recognition, or photographing)=(0.2, 0.39, 0.41, 0), there is a possibility that there are two situations of absence and third-party recognition, and thus both two types of deep inference may be used. For another example, in the case of use for a security purpose according to administrator setting, when a probability value for the normal situation is less than or equal to a specific preset value regardless of probability values for other abnormal situations, inference of all available high-depth models may be performed. For still another example, when the time and attendance management is used according to the administrator setting, only high-depth inference about the absence situation may be performed.

In one embodiment, when the probability value for the normal situation is less than or equal to a third preset value, the continuous use certification device 100 may transmit a request signal requesting inference through the high-depth inference model of the server 300, the current image, and the probability value to the server 300.

In one embodiment, the continuous use certification device 100 may compare the user's face in the current image with a pre-stored normal state image on the basis of the low-depth inference model to certificate whether the user is a user corresponding to the pre-stored normal state image, and at the same time, analyze the current image taken continuously in real time to determine whether the user's gaze, gesture, behavior, mouth shape, or rear background image has changed and whether a preset attention object (e.g., camera device, etc.) is present in the current image, and monitor whether the certificated user is still in use with normal behavior. Such analysis may also be performed in the high-depth inference model in subsequent operations.

In one embodiment, when the inferred classification state for the user is determined, the continuous use certification device 100 may store and manage event information including the determined inferred classification state, the corresponding probability value, and the current image. For example, the server 300 may store and manage event information including the plurality of classification states, the probability values for the plurality of classification states, and the current image from the client terminal 200, and finally determine whether a problem occurs on the basis of the probability value received from the client terminal 200.

In one embodiment, when the inferred classification state for the user is included in an abnormality category, the continuous use certification device 100 may provide an alarm indicating that a problem is likely to occur. In one embodiment, the alarm may include a response request for the determined inferred classification state. For example, the server 300 may transmit an alarm message including the determined inferred classification state and the response request therefor to the client terminal 200 and/or to a work server (not illustrated) that performs a work process in conjunction with the client terminal 200, so that the server 300 may control the client terminal 200 or support the work server to control the client terminal 200. Examples related to the response request will be described in more detail in the content related to operation S350.

In one embodiment, the continuous use certification device 100 may end the continuous use certification process for the current image without performing operations S330 to S350 after providing the alarm. For example, when the accuracy of the inference of the low-depth inference model evaluated according to the administrator setting or during a preset period is a preset level or higher, only the alarm may be provided and subsequent operations using the high-depth inference model may be omitted.

In one embodiment, the continuous use certification device 100 may obtain a switchover request as obtaining an error message for the determination of the inferred classification state. For example, when a preset switchover condition is satisfied in the client terminal 200, the client terminal 200 may generate the switchover request indicating a situation in which low-depth inference cannot proceed. In one embodiment, the preset switchover condition may correspond to a case in which the client terminal 200 is set to a model in which low-depth inference cannot be performed during the initial user certification process (e.g., a case of a lightweight device on which deep learning inference is difficult to be performed, such as a mobile phone or the like), a case in which the user determines that inference is impossible through the provision of a button, a case in which an abnormal situation occurs during inference, or the like.

In one embodiment, the continuous use certification device 100 may transmit the normal state image and the current image to the inference server 400 in response to the switchover request, and the inferred classification state for the user may be determined on the basis of the low-depth inference model implemented in the inference server 400. For example, the client terminal 200 may transmit the switchover request to the server 300, the server 300 may change location information, which indicates where the low-depth inference is to be performed, in response to the switchover request so that the changed location information indicates the inference server 400, store event occurrence history related to the inference switchover, and transmit the normal state image, the background image, and the current image to the inference server 400 to request acquisition of the low-depth inference model optimized for the user, and the inference server 400 may generate the low-depth inference model for the user by loading the pre-stored low-depth inference model for the user or by using the normal state image, the background image, and the fake data, and apply the current image to the low-depth inference model in order to determine the inferred classification state.

As described above, in an environment in which the low-depth inference model, which is a lightweight model, cannot be performed in the client terminal 200, e.g., when a computer has low specifications or while performing a task that uses a processor or memory excessively, inference location may be changed so that the low-depth inference model is performed in the server 300 by loading the low-depth inference model.

In operation S330, when the inferred classification state for the user is included in the abnormality category, the continuous use certification device 100 may determine the high-depth inference model corresponding to the inferred classification state from among the plurality of high-depth inference models. In one embodiment, the determination of the high-depth inference model may be performed in the server 300. For example, each of the plurality of classification states may correspond to each of a plurality of different high-depth inference models, and when event information including the current image, the determined inferred classification state, and the corresponding probability value is received from the client terminal 200, the server 300 may determine a specific high-depth inference model corresponding to the determined inferred classification state to use the specific high-depth inference model in the subsequent operations.

In one embodiment, the high-depth inference model may include a second deep learning inference model that requires resources at a preset level or more in the inference process. For example, the high-depth inference model may be implemented through a second CNN inference model having a high accuracy compared to the low-depth inference model by applying a heavyweight neural network structure. Thus, the high-depth inference model may continuously operate in the server 300 with relatively high specifications. In one embodiment, the high-depth inference model may be obtained based on a deep analytic AI platform (DAP) technology for high computing power and high-performance cognition.

In one embodiment, there is no "implementation method (e.g., algorithm and neural network construction method)" and "quantitative standard" for "recognition/classification performance" in the distinction between a low-depth inference model and a high-depth inference model, and the distinction between the low-depth inference model and the high-depth inference model may be determined by a usage environment and the suitability for purpose. Throughout this specification, although an embodiment is mainly described in which a model that minimizes consideration of latency (e.g., inference latency) and guarantees maximum accuracy (e.g., classification/recognition performance) for a specific situation is defined as a "high-depth inference model," and a lightweight model that less considers classification/recognition performance for the same situation but secure an inference frequency suitable for a situation where continuous use certification is applied is defined as the "low-depth inference model." However, the present disclosure should not be construed as being limited thereto, and it may be seen that the inference model may be modified and used in a distinguishable form by various criteria.

Generally, models with high accuracy require long inference/learning times and require computing resources with high specifications, and thus such models are not suitable for "continuous use certification." However, by supplementing characteristics of the two exclusive models, e.g., inverse proportion of inference time and accuracy, through distinction and collaboration according to the "depth" of the same model, it is possible to achieve the highest accuracy and high-speed/high-frequency situation determination.

In operation S340, the continuous use certification device 100 may apply the current image to the high-depth inference model to determine the reliability of the inferred classification state for the user. In one embodiment, the determination of the reliability of the inferred classification state may be performed in the server 300. For example, in operations S310 and S320, the server 300 may generate a plurality of different CNN-based high-depth inference models corresponding to the plurality of classification states using the converted image acquired by applying the fake data to the normal state image and the background image, and, when any one of the plurality of high-depth inference models is determined according to the inferred classification state in operation S330, the server 300 may apply the current image to the determined high-depth inference model to determine the reliability of the inferred classification state for the user according to the comparison result of the converted image and the current image.

In one embodiment, when a classification state received from the client terminal 200 is different from the classification state determined by applying the corresponding high-depth inference model, a probability value in each classification state may be determined by applying the current image to each of the plurality of high-depth inference models, and a classification state in which the probability value is greater than or equal to the first preset value or a difference between the first probability value and the second probability value is greater than or equal to the second preset value may be determined as the inferred classification state for the user.

In operation S350, when the reliability is greater than or equal to a preset value, the continuous use certification device 100 may transmit a response request for the inferred classification state for the user. For example, the server 300 may transmit the determined inferred classification state and the response request therefor to the client terminal 200 and/or to the work server that performs the work process in conjunction with the client terminal 200, and control the client terminal 200 or support the work server to control the client terminal 200.

In one embodiment, the response request may include at least one of a request for transmitting an e-mail to an administrator's account, a request for forced termination of a program determined according to the inferred classification state for the user, a request for blocking a function of an input/output unit in a client terminal, a request for blocking communication of the client terminal, and a request for displaying preset warning content on the client terminal, and these requests may be requests for control until the inferred classification state for the user updated in real time is included in the normality category.

In one embodiment, the e-mail transmission to the administrator's account indicates the transmission of a notification message including at least one of detailed information about the classification state, the corresponding probability value, and the current image to the administrator's account, and for example, the corresponding control may be performed in the server 300. In one embodiment, the forced termination of the program determined according to the inferred classification state for the user indicates suspension of use for a specific program whose use is set to be restricted for each user according to the corresponding classification state, and for example, the corresponding control may be performed in the work server in response to a request of the server 300. In one embodiment, the function blocking of the input/output unit in the client terminal 200 indicates blocking of at least one of a user screen and an input/output device in the client terminal 200, and for example, the corresponding control may be performed in the client terminal 200 in response to a request of the server 300.

In one embodiment, the displaying of the preset warning content on the client terminal 200 indicates displaying of warning content (e.g., a warning message, a warning screen saver, etc.) corresponding to the determined inferred classification state, and for example, the displaying of the warning content and the blocking of the communication may be performed in the client terminal 200 in response to a request of the server 300.

In one embodiment, the continuous use certification device 100 may perform or support the control by generating a response request corresponding to the determined inferred classification state from among a plurality of pre-stored control policies for the user. For example, when the inferred classification state is recognized as a classification state included in an abnormality category, a control policy which is set for each classification state by an administrator and associated with the user, from among the plurality of control policies, may be executed. In one embodiment, the above-described inference model and control policy may be determined based on the settings of the administrator and/or user.

In one embodiment, the continuous use certification device 100 may determine the degree of risk on the basis of the probability values of the plurality of classification states and may allow at least one of the plurality of control policies to be included in the response request on the basis of the degree of risk. For example, in the case in which the inferred classification state is determined to be a first situation (e.g., absence situation) according to the probability values (e.g., 0.1, 0.7, 0.5 and 0.4) respectively corresponding to the normal situation, the absence situation, the uncertificated user confirmation situation, and the photographing situation, when the probability value (e.g., 0.7) of the first situation is less than or equal to the sum (e.g., 1.0) of the probability values (e.g., 0.1, 0.5, and 0.4) of the other situations, a control policy set for a classification state having a largest probability value from among the probability values of the other situations or the classification state having the preset value or more may be included in the response request.

That is, even though the inferred classification state is determined as the absence situation, when the other situations also have some probability, the response request for the inferred classification state determined in such a way may include a second control policy (e.g., forced termination of the related program) corresponding to the uncertificated user confirmation situation in addition to a first control policy (e.g., displaying and blocking of the input/output unit) corresponding to the absence situation.

In one embodiment, the degree of risk may be determined based on different weights assigned to the plurality of classification states. For example, the weight may be increased in the order of the photographing situation, the uncertificated user confirmation situation, and the absence situation. Further, in one embodiment, when the degree of risk is greater than or equal to a preset value, the continuous use certification device 100 may include a preset highest level control policy in the response request, and may gradually upgrade a control level of the control policy as the degree of risk increases.

According to one embodiment of the present disclosure, security risk and convenience of remote work can be improved by determining the inferred classification state for the user using the AI-based inference model and transmitting the response request therefor.

According to one embodiment of the present disclosure, there are special advantages that, by implementing the low-depth inference model in the client terminal 200 and implementing the high-depth inference model in the server 300, the continuous use certification for the user in various situations may be performed in the client terminal 200 itself, and that, by allowing the server 300 to proceed with high-depth inference only when a problem is detected, it is efficient in terms of accuracy and usage of resources.

Figure 4:
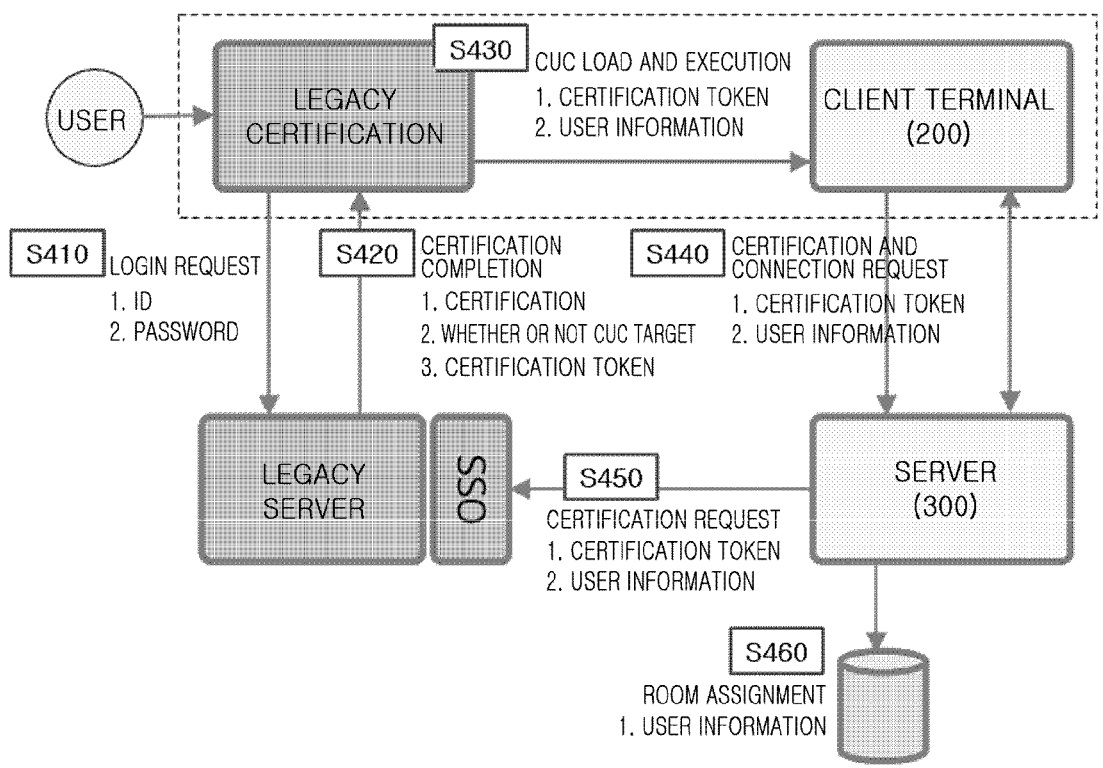
FIG. 4 is a flowchart illustrating a method for a continuous use certification device to perform an initial user certification process according to an embodiment.

FIG. 4 is a flowchart illustrating a method for the continuous use certification device 100 to perform an initial user certification process according to an embodiment.

In operation S410, the continuous use certification device 100 may obtain login information (e.g., ID and/or password) of a user, and in operation S420, the continuous use certification device 100 may determine whether the user is subject to continuous use certification on the basis of the login information. For example, according to legacy certification associated with the user's work, a login request (e.g., ID and/or password) may be transmitted to a legacy server to request certification, and accordingly, the legacy server (e.g., the work server) may perform certification and return information on whether the user is certificated, information on whether the user is subject to the continuous use certification, single sign-on (SSO) information, a certification token, and the like to the continuous use certification device 100.

In operations S430 to S460, when the user is subject to the continuous use certification, the continuous use certification device 100 may set the certification token and the user information. For example, in operation S430, when the user is subject to the continuous use certification (CUC), the continuous use certification device 100 may load and execute a library (e.g., js lib) related to the continuous use certification. In operation S440, the client terminal 200 may call a connection request with the SSO information and the user information to the corresponding library. In operation S450, the server 300 may check the user through SSO. In operation S460, when it is checked that the user is a normal user, it is checked which room (e.g., work) the user corresponds to, and then a connection to the corresponding room may be processed. That is, in operation S460, the working room is assigned to the user certified as the normal user.

Figure 5:
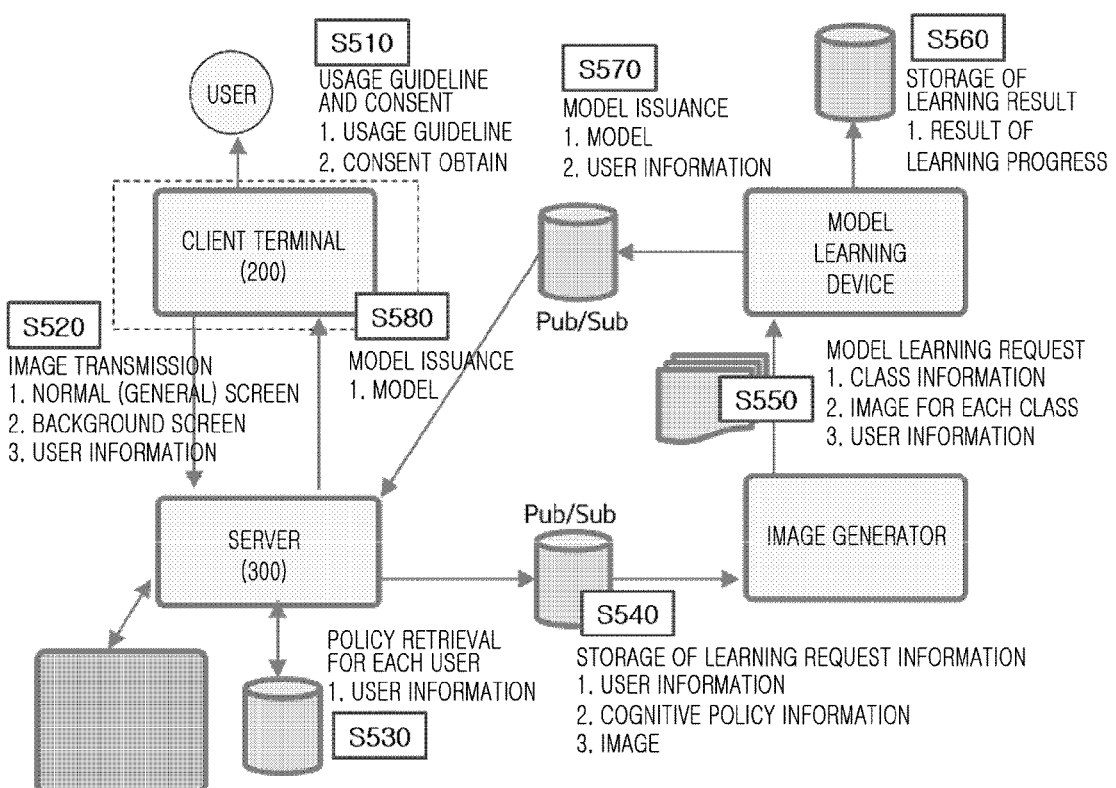
FIG. 5 is a flowchart illustrating a method for a continuous use certification device to perform learning for a low-depth inference model according to an embodiment.

FIG. 5 is a flowchart illustrating a method for the continuous use certification device 100 to perform learning for a low-depth inference model according to an embodiment.

In operation S510, the client terminal 200 may obtain user consent for continuous use certification for a user, and for example, the client terminal 200 may obtain the user consent for the continuous use certification for the user when a connection to the server 300 is completed.

In operation S520, when the user consent is obtained, the client terminal 200 may acquire a normal state image and a background image by photographing a learning image (frame) in conjunction with a built-in camera module (e.g., a webcam), and transmit the acquired image (e.g., the normal state image and the background image) and user information to the server 300. In this case, for example, an interface for a PC screen and 2 channels may be maintained, a still image captured for a specific period of time may be acquired as the normal state image with a single click when acquiring an image, and reserved photographing may be performed together with a guide message when photographing the background (e.g., outputting a message saying, "Now, we'll take a picture of the user's working environment. Press the button and leave your seat for about 10 seconds.").

In operation S530, the server 300 may retrieve a classification state (e.g., recognition situation) registered to the user, and in operation S540, the server 300 may store the user information, the retrieved classification state (e.g., cognitive policy information), and learning request information including the images such as the normal state image and the background image. For example, as described above, a plurality of classification states such as an absence state, a third-party state, or a photographing state may be retrieved.

In operation S550, the server 300 may add as many classifiers as the recognition items of the retrieved classification state and generate a learning (converted/synthesized) image for each situation.

In operation S560, the server 300 may learn a model according to the content defined in operation S550 to obtain a low-depth inference model. When the learning is completed and thus the low-depth inference model is obtained, the server 300 may store the low-depth inference model and the user information in operation S570, and then distribute the low-depth inference model to the client terminal 200 in operation S580.

Figure 6:
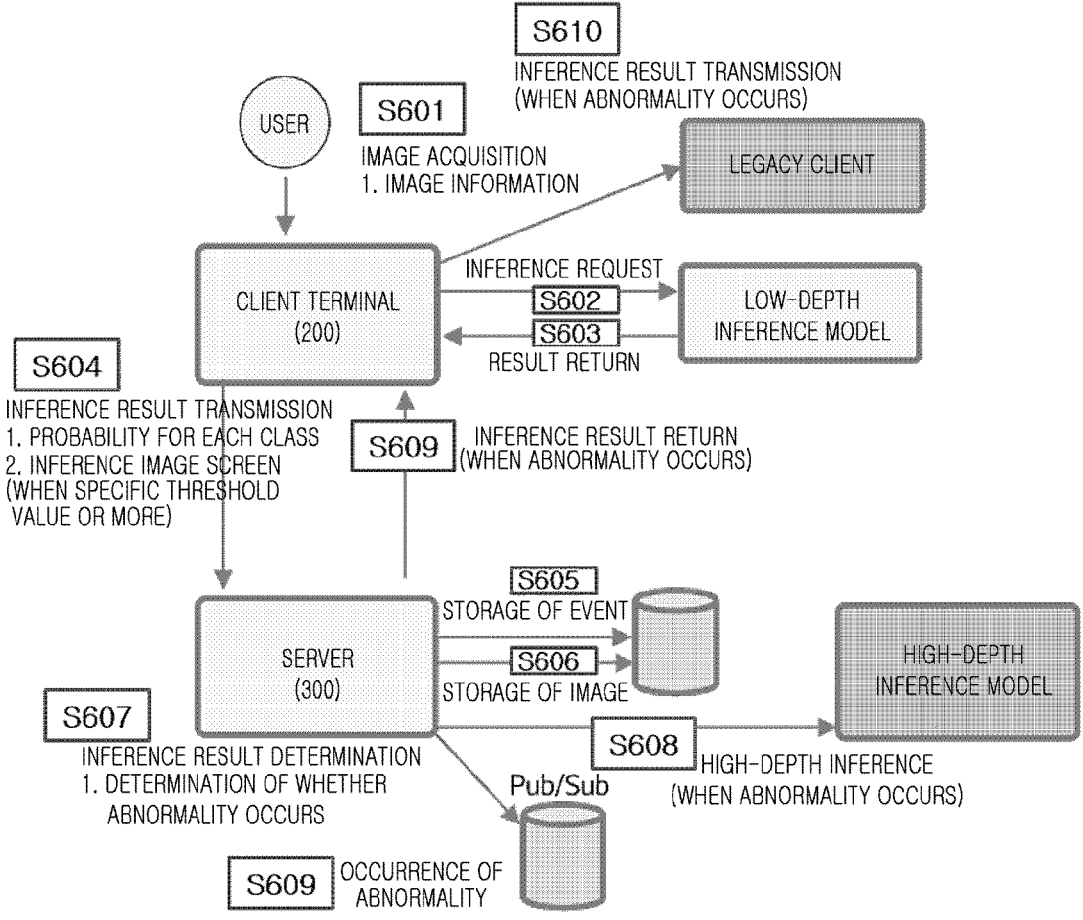
FIG. 6 is a flowchart illustrating a method for a client terminal to determine an inferred classification state for a user using a low-depth inference model according to an embodiment.

FIG. 6 is a flowchart illustrating a method for the client terminal 200 to determine an inferred classification state for a user using a low-depth inference model according to an embodiment.

In operation S601, the client terminal 200 may acquire a current image for a user by capturing an image through a camera module (e.g., a webcam), in operation S602, the client terminal 200 may perform inference using a low-depth inference model obtained from the server 300, and in operation S603, the client terminal 200 may determine an inferred classification state for the user according to a result of performing the inference.

In operation S604, the client terminal 200 may transmit an inference result including the inferred classification state and a probability value to the server 300. For example, when a probability value in a classification state of a normal situation is greater than or equal to a threshold value, the client terminal 200 may transmit the corresponding probability value to the server 300. On the other hand, when the probability value in the classification state of the normal situation is less than the threshold value, the client terminal 200 may transmit the corresponding probability value together with the current image to the server 300. When the probability value in the classification state of the normal situation is too low so that it is below a set value, a specific function for requesting inference may be called to the inference server 400.

In operations S605 and S606, the server 300 may store and manage event information including the received inference result and the current image in a database.

In operation S607, the server 300 may determine whether an abnormality occurs on the basis of the probability value included in the received inference result, and when it is determined that the abnormality occurs, in operation S608, the server 300 may re-determine the inferred classification state for the user using a high-depth inference model.

In operation S609, when it is finally determined that the classification state determined using the high-depth inference model is included in an abnormality category and the abnormality occurs, the server 300 may transmit an inference result including the content of the classification state and a response request therefor to the client terminal 200 to support immediate control accordingly. In operation S610, when it is determined that the abnormality occurs, the client terminal 200 may transmit the inference result to a legacy client to support a response thereto.

Figure 7:
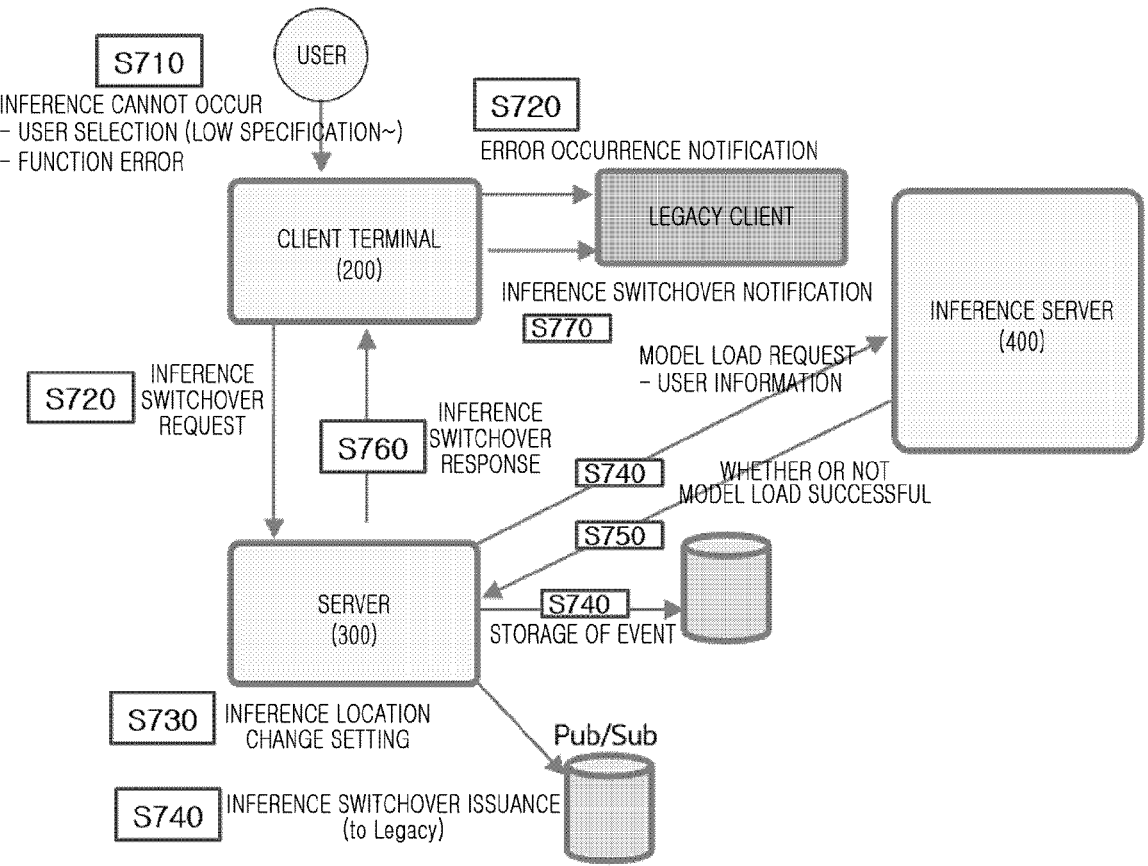
FIG. 7 is a flowchart illustrating a method for an inference server to determine a classification state according to a switchover request of a client terminal in a continuous use certification device according to an embodiment.

FIG. 7 is a flowchart illustrating a method for the inference server 400 to determine a classification state according to a switchover request of a client terminal 200 in a continuous use certification device 100 according to an embodiment.

In operation S710, the client terminal 200 may detect whether a situation in which inference for a classification state cannot be made occurs, and in operation S720, when it is detected that the situation in which the inference cannot be made occurs, the client terminal 200 may generate an error message for the determination of the classification state and transmit a switchover request to the server 300. For example, the switchover request may be generated by setting, by a user, the client terminal 200 to a model in which inference cannot be made (e.g., when logging in), by determining, by the user, that the inference cannot be made (e.g., providing a button), or by automatically recognizing that an abnormal situation occurs during the inference.

In operation S730, the server 300 may change an inference location flag in response to the switchover request. In operation S740, the server 300 may store an event indicating that the inference is switched to server inference, transmit a message for the inference switchover to a legacy server, and transmit user information to the inference server 400 to request loading of an inference model (e.g., a low-depth inference model or a high-depth inference model) for the user.

In operation S750, when the inference model for the user is loaded successfully, the inference server 400 may transmit a response message for the loading request to the server 300. In operation S760, the server 300 may transmit an inference switchover response message indicating that the inference server 400 is ready to the client terminal 200. In operation S770, the client terminal 200 may transmit an inference switchover notification message indicating that the inference switchover is in progress to a legacy terminal.

Figure 8:
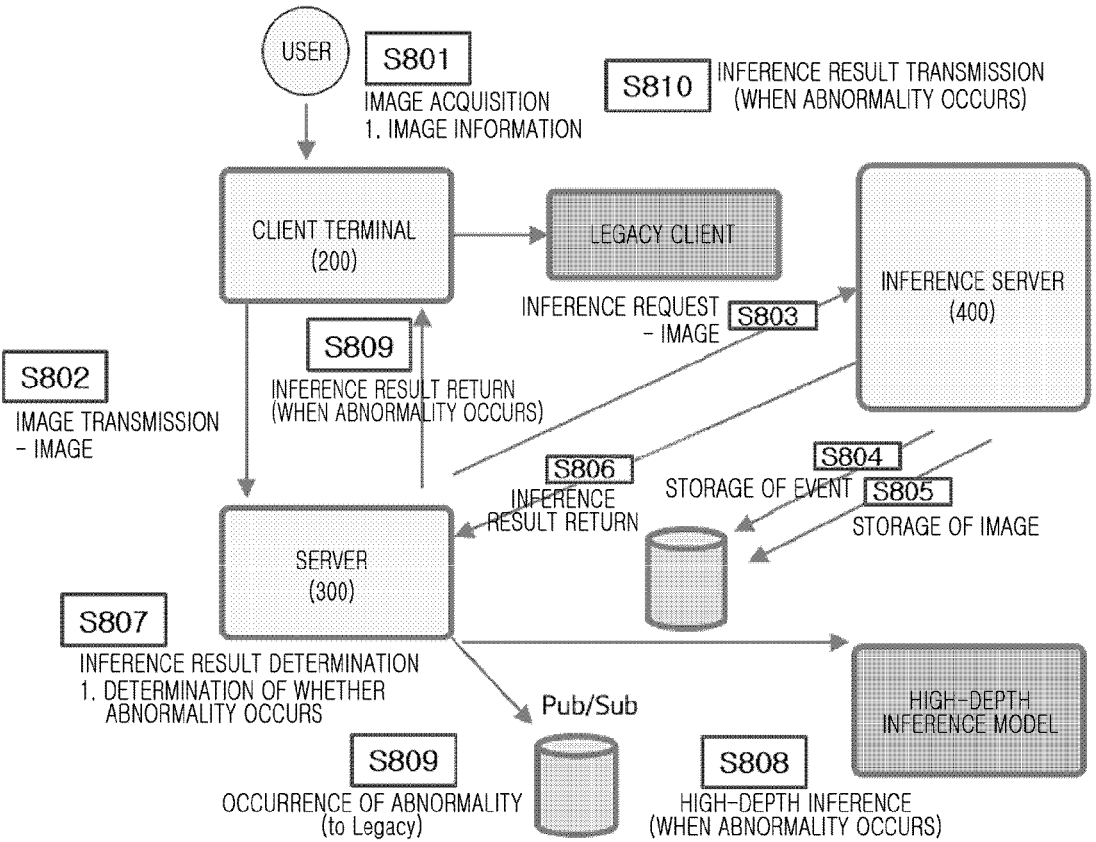
FIG. 8 is a flowchart illustrating a method for a server to determine an inferred classification state for a user using a low-depth inference model and a high-depth inference model according to an embodiment.

FIG. 8 is a flowchart illustrating a method for the server 300 to determine an inferred classification state for a user using a low-depth inference model and a high-depth inference model according to an embodiment. In this case, the client terminal 200 may provide only an image for a user, and all determinations of classification states may be performed in the server 300 and/or the inference server 400.

In operation S801, the client terminal 200 may acquire a current image for the user by capturing an image through a camera module (e.g., a webcam), and in operation S802, the client terminal 200 may transmit the current image to the server 300.

In operation S803, the server 300 may transmit the received current image to the inference server 400 to request low-depth inference. In operations S804 and S805, the inference server 400 may apply the received current image to a low-depth inference model for the user to perform the low-depth inference and store event information and the current image according to the low-depth inference in a database, and in operation S806, the inference server 400 may transmit a result of performing the inference to the server 300.

In operation S807, the server 300 may determine whether an abnormality occurs on the basis of a probability value included in the received inference result, and when it is determined that the abnormality occurs, in operation S808, the server 300 may re-determine an inferred classification state for the user using a high-depth inference model.

In operation S809, when it is finally determined that the classification state determined using the high-depth inference model is included in the abnormality category and the abnormality occurs, the server 300 may transmit the inference result including the content of the classification state and a response request therefor to the client terminal 200 to support immediate control accordingly. In operation S810, when it is determined that the abnormality occurs, the client terminal 200 may transmit the inference result to a legacy client to support a response thereto.

Figure 9:
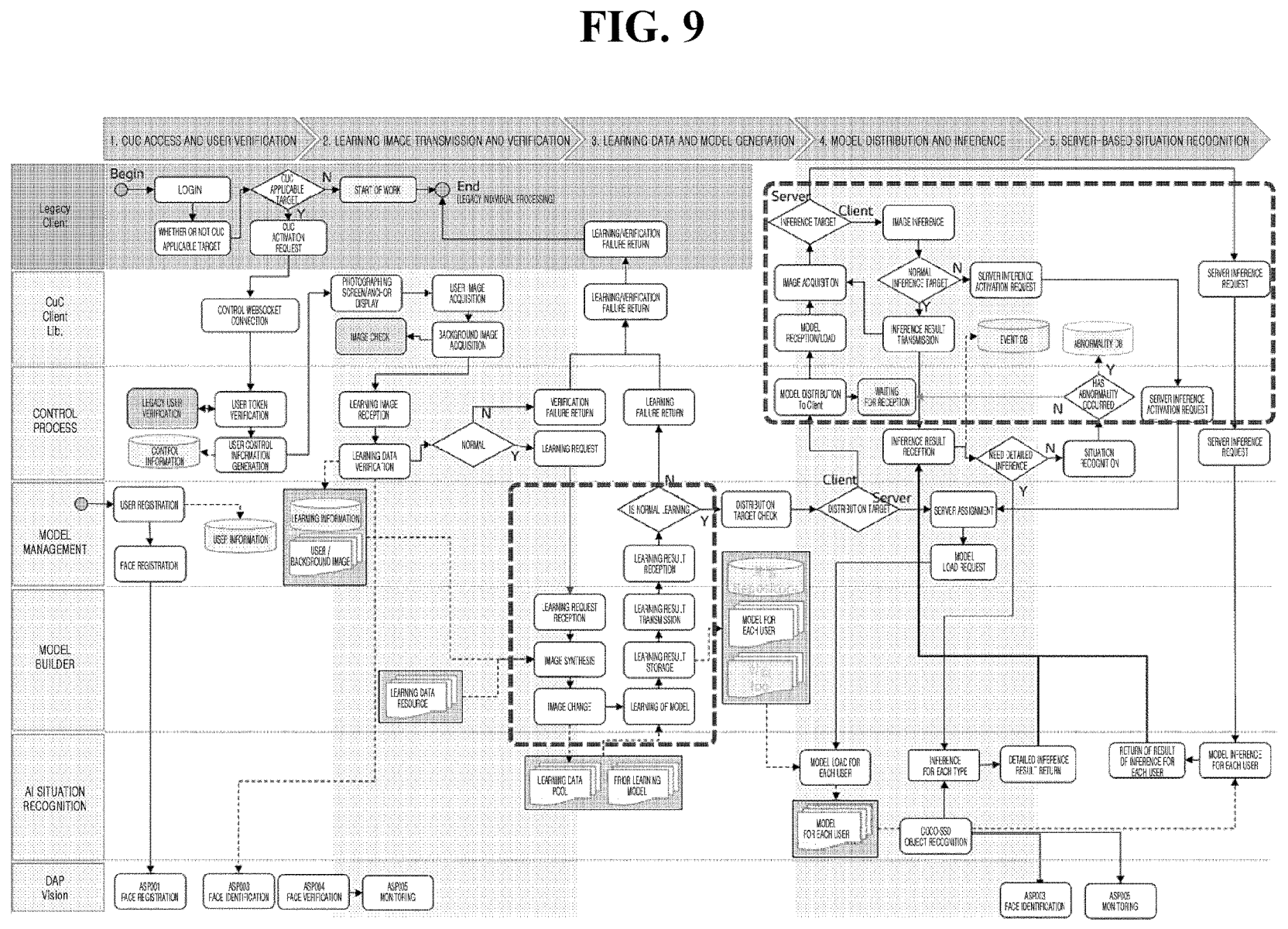

FIG. 9 is a flowchart illustrating a series of operations in which a continuous use certification device 100 obtains and learns an inference model for a user and determines an inferred classification state for the user on the basis of the obtained and learned inference model according to an embodiment.

As illustrated in FIG. 9, the continuous use certification device 100 may perform a process of verifying a user accessing a system, a process of verifying a learning image acquired by photographing the user and transmitting the learning image, a process of generating a low-depth inference model for the user on the basis of learning data, a process of determining an inferred classification state for the user by distributing the low-depth inference model and analyzing a current image of the user in real time on the basis of the low-depth inference model, and a process in which server-based situational recognition is performed when the determined classification state is included in an abnormality category.

In one embodiment, operations related to a legacy client and a continuous use certification client library (CUC client Lib.) that are illustrated in FIG. 9 may be performed in the client terminal 200, and operations related to a control process, model management, a model builder, AI situation recognition, and delivered-at-place (DAP) vision may be performed in the server 300 or may be performed in conjunction with the inference server 400 as necessary.

As described above, in one embodiment of the present disclosure, AI-based facial recognition inference for a user may be performed by a low-depth inference model in the client terminal 200 and a high-depth inference model in the server 300. For example, only when an abnormal situation is detected in the client terminal 200 that performs real-time low-depth inference, the server 300 proceeds with high-depth inference and performs a response to the high-depth inference. Thus high recognition accuracy and low resource consumption can be implemented in various situations, and high security can be secured due to immediate response for each situation.

It can be seen that the order and combination of the operates illustrated above is an embodiment, and may be variously implemented in the form of addition, omission, or modification of the order, combination, branch, function, and subject of execution thereof without departing from the essential characteristics of each component described in the specification.

Meanwhile, the above-described method may be written as a program that may be executed in a computer and may be implemented in a general-purpose digital computer that operates the program using a computer readable recording medium. Also, a structure of data used in the above-described method may be recorded in the computer readable recording medium through several methods. The computer readable recording medium includes a storage medium such as a magnetic storage medium (for example, a read only memory (ROM), a random-access memory (RAM), a Universal Serial Bus (USB), a floppy disk, and a hard disk), and an optical reading medium (for example, a compact disc read only memory (CD-ROM) and a digital video disc (DVD)).

The above description of the present disclosure is only exemplary, and it will be understood by those skilled in the art that various modifications can be made without departing from the technical scope of the present disclosure and without changing essential features. Therefore, the above-described embodiments should be considered in a descriptive sense only and not for purposes of limitation. For example, each component described as a single type may be realized in a distributed manner, and similarly, components that are described as being distributed may be realized in a coupled manner.

The scope of the present disclosure is defined not by the detailed description but by the appended claims and encompasses all modifications or alterations derived from meanings, the scope, and equivalents of the appended claims.

The invention claimed is:

1. A continuous use certification method comprising:
acquiring a normal state image and a current image for a user;
determining an inferred classification state for the user from among a plurality of classification states by applying the normal state image and the current image to a low-depth inference model for the user;
when the inferred classification state is included in an abnormality category, determining a high-depth inference model corresponding to the inferred classification state from among a plurality of high-depth inference models;
determining reliability of the inferred classification state by applying the current image to the high-depth inference model;
obtaining a switchover request according to obtaining of an error message for the determination of the inferred classification state;
transmitting the normal state image and the current image to an inference server in response to the switchover request; and
determining the inferred classification state on the basis of a low-depth inference model implemented in the inference server,
wherein the determining of the inferred classification state for the user is performed in a client terminal, and the determining of the reliability of the inferred classification state is performed in a server.

2. The continuous use certification method of claim 1, wherein the determining of the inferred classification state for the user includes:
applying fake data to the normal state image to acquire a converted image;
obtaining a comparison result of the converted image and the current image using a convolutional neural network (CNN); and
determining the inferred classification state according to the comparison result using the low-depth inference model.

3. The continuous use certification method of claim 1, wherein, in the acquiring of the normal state image and the current image, a background image for the user is further acquired, and
wherein, in the determining of the inferred classification state for the user, the inferred classification state is determined by applying the normal state image, the current image, and the background image to the low-depth inference model.

4. The continuous use certification method of claim 1, wherein the plurality of classification states include an absence situation, an uncertificated user confirmation situation, and a photographing situation, and
wherein, in the determining of the inferred classification state for the user, a probability value for each of the plurality of classification states is determined, and a classification state in which the probability value is greater than or equal to a preset value is determined as the inferred classification state.

5. The continuous use certification method of claim 4, wherein, in the determining of the inferred classification state for the user, based on a comparison result of a first probability value that is highest and a second probability value that is secondarily high among the probability values for the plurality of classification states, a classification state corresponding to the first probability value is determined as the inferred classification state.

6. The continuous use certification method of claim 1, wherein the normal state image is acquired a predetermined number of times by photographing the user in an initial user certification process, and
the current image is continuously acquired over time by photographing the user in a continuous use certification process.

7. The continuous use certification method of claim 1, further comprising, when the inferred classification state is included in the abnormality category, providing an alarm indicating that a problem is likely to occur.

8. The continuous use certification method of claim 1, further comprising, when the reliability is greater than or equal to a preset value, transmitting a response request for the inferred classification state,
wherein the response request includes one or more of a request for transmitting an e-mail to an administrator's account, a request for forced termination of a program determined according to the inferred classification state, a request for blocking a function of an input/output unit in a client terminal, a request for blocking communication of the client terminal, and a request for displaying preset warning content on the client terminal.

9. The continuous use certification method of claim 1, wherein the acquiring of the normal state image and the current image for the user further includes:
acquiring the normal state image and a background image for the user in an initial user certification process;
applying fake data to the normal state image and the background image to acquire a plurality of converted images;
applying learning data including the normal state image, the background image, and the plurality of converted images to a CNN-based low-depth inference model to perform learning to determine the inferred classification state for the user; and
obtaining the low-depth inference model for the user according to a result of performing the learning.

10. A computer-readable recording medium on which a program for executing the continuous use certification method of claim 1 in a computer is recorded.

11. A continuous use certification device comprising:
a control unit configured to acquire a normal state image and a current image for a user, apply the normal state image and the current image to a low-depth inference model to determine an inferred classification state for the user from among a plurality of classification states, determine a high-depth inference model corresponding to the inferred classification state from among a plurality of high-depth inference models when the inferred classification state is included in an abnormality category, and apply the current image to the high-depth inference model to determine reliability of the inferred classification state; and
a storage unit configured to store the normal state image and the current image, wherein the determination of the inferred classification state for the user is performed in a client terminal, and the determination of the reliability of the inferred classification state is performed in a server, wherein the control unit is further configured to obtain a switchover request according to obtaining an error message for the determination of the inferred classification state, and to transmit the normal state image and the current image to an inference server in response to the switchover request, and wherein the inference server is configured to determine the inferred classification state on the basis of a low-depth inference model implemented in the inference server.

12. The continuous use certification device of claim 11, wherein the control unit applies fake data to the normal state image to acquire a converted image, obtains a comparison result of the converted image and the current image using a convolutional neural network (CNN), and determines the inferred classification state according to the comparison result using the low-depth inference model.

13. The continuous use certification device of claim 11, wherein the control unit further acquires a background image for the user and determines the inferred classification state by applying the normal state image, the current image, and the background image to the low-depth inference model.

14. The continuous use certification device of claim 11, wherein the plurality of classification states include an absence situation, an uncertificated user confirmation situation, and a photographing situation, and wherein the control unit determines a probability value for each of the plurality of classification states and determines a classification state in which the probability value is greater than or equal to a preset value as the inferred classification state.

15. The continuous use certification device of claim 11, wherein the normal state image is acquired a predetermined number of times by photographing the user in an initial user certification process, and the current image is continuously acquired over time by photographing the user in a continuous use certification process.

16. The continuous use certification device of claim 11, wherein, when the reliability is greater than or equal to a preset value, the control unit transmits a response request for the inferred classification state, and the response request includes one or more of a request for transmitting an e-mail to an administrator's account, a request for forced termination of a program determined according to the inferred classification state, a request for blocking a function of an input/output unit in a client terminal, a request for blocking communication of the client terminal, and a request for displaying preset warning content on the client terminal.

* * * * *